(12) United States Patent
Liaw et al.

(10) Patent No.: US 7,329,031 B2
(45) Date of Patent: Feb. 12, 2008

(54) LED HEADLIGHT FOR BICYCLE WITH HEAT REMOVAL DEVICE

(76) Inventors: Suh Jang Liaw, No. 18, Longshin 1st Alley, Fushan Lane, Taichung City (TW); Di Shun Liao, No. 18, Longshin 1st Alley, Fushan Lane, Taichung City (TW)

( * ) Notice: Subject to any disclaimer, the term of this patent is extended or adjusted under 35 U.S.C. 154(b) by 0 days.

(21) Appl. No.: 11/480,166

(22) Filed: Jun. 29, 2006

(65) Prior Publication Data

US 2008/0002416 A1    Jan. 3, 2008

(51) Int. Cl.
*F21V 29/00* (2006.01)
(52) U.S. Cl. .................... 362/475; 362/373
(58) Field of Classification Search ........... 362/475, 362/373, 192, 476

See application file for complete search history.

(56) References Cited

U.S. PATENT DOCUMENTS 1,987,396 A * 1/1935 Fullerton ............ 340/815.69
6,264,351 B1 * 7/2001 Taylor et al. ............ 362/475

* cited by examiner

*Primary Examiner*—Sharon E. Payne
(74) *Attorney, Agent, or Firm*—Pro-Techtor Int'l Services

(57) ABSTRACT

A headlight for bicycle includes an insulative barrel and including peripheral openings; a lens mounted in the barrel; a heat sink including parallel grooves on its outer surface, and water resistant rings mounted thereon; a PCB fitted onto an end of the barrel; a reflector mounted inside the barrel; an LED bulb fitted in the reflector; and a conductor electrically interconnected the bulb and the PCB; and a power supply releasably secured to the barrel and including a switch. The switch is manually movable between on and off position and is adapted to electrically connect the power supply to the bulb when the switch is in the on position, and in response to disposing the switch in the on position, heat generated by the bulb is dissipated through the conductor, the heat sink, and the openings.

1 Claim, 7 Drawing Sheets

LED HEADLIGHT FOR BICYCLE WITH HEAT REMOVAL DEVICE

BACKGROUND OF THE INVENTION

1. Field of Invention

The present invention relates to headlight of bicycle and more particularly to such a headlight having a high power LED (light-emitting diode) bulb and an improved heat removal device for effectively dissipating heat generated when the bulb is lit.

2. Related Art

LED lamps are well known in the art. LED lamps are advantageous for its high illumination and low power consumption. It is known that high power LED lamps may generate high heat when turning on. Thus, heat dissipation is a critical issue to deal with. However, for bicycle application a high power LED headlight having a good heat dissipation device has not been commercially available so far as the present inventor is aware. Thus, continuing improvements in the exploitation of an LED headlight for bicycle having a novel heat removal device are constantly being sought.

SUMMARY OF THE INVENTION

It is therefore an object of the present invention to provide a LED headlight for a bicycle having a heat removal device for quickly dissipating high heat generated by its LED bulb in an operating state of the headlight.

To achieve the above and other objects, the present invention provides a headlight mountable on a bicycle comprising a head assembly and a battery compartment. The head assembly includes a substantially cylindrical barrel formed of an insulative material and has a plurality of openings equally spaced apart around its outer surface, a rearward annular staged extension, a cut on the extension, and a plurality of front slots on an inner surface. The head assembly also comprises a circular lens having a plurality of projections on its periphery; a cylindrical heat sink having a plurality of parallel grooves on its outer surface, with at least one annular first trough spaced from a rear end of the grooves, and with at least one annular second trough spaced from a front end of the grooves. The head assembly also comprises a water resistant ring assembly including at least one first sealing ring put on the first trough, with at least one second sealing ring put on the second trough; a print circuit board (PCB) including a rear first contact projected out of the cut and secured thereto when the PCB is fitted onto an end of the barrel, having a plurality of second contacts. The head assembly also comprises a parabolic reflector including a rear opening; an LED bulb fitted in the opening of the reflector; and a heat conductive disk including a center hole and a plurality of conductors having one ends electrically connected to the LED bulb and the other ends electrically connected to the second contacts of the PCB wherein the heat conductive disk is mounted on a rear portion of the reflector, the reflector is mounted inside the barrel, and the projections are fitted in the slots to secure the lens to a front end of the barrel. The head assembly further comprises a power supply releasably secured to the extension and including a switch; wherein the switch is manually movable between on and off position and is adapted to electrically connect the power supply to the LED bulb by connecting to the first contact when the switch is in the on position. In response to disposing the switch in the on position, heat generated by the LED bulb is dissipated through the heat conductive disk, the heat sink, and the openings of the barrel.

The above and other objects, features and advantages of the present invention will become apparent from the following detailed description taken with the accompanying drawings.

DETAILED DESCRIPTION OF THE INVENTION

Figure 1:
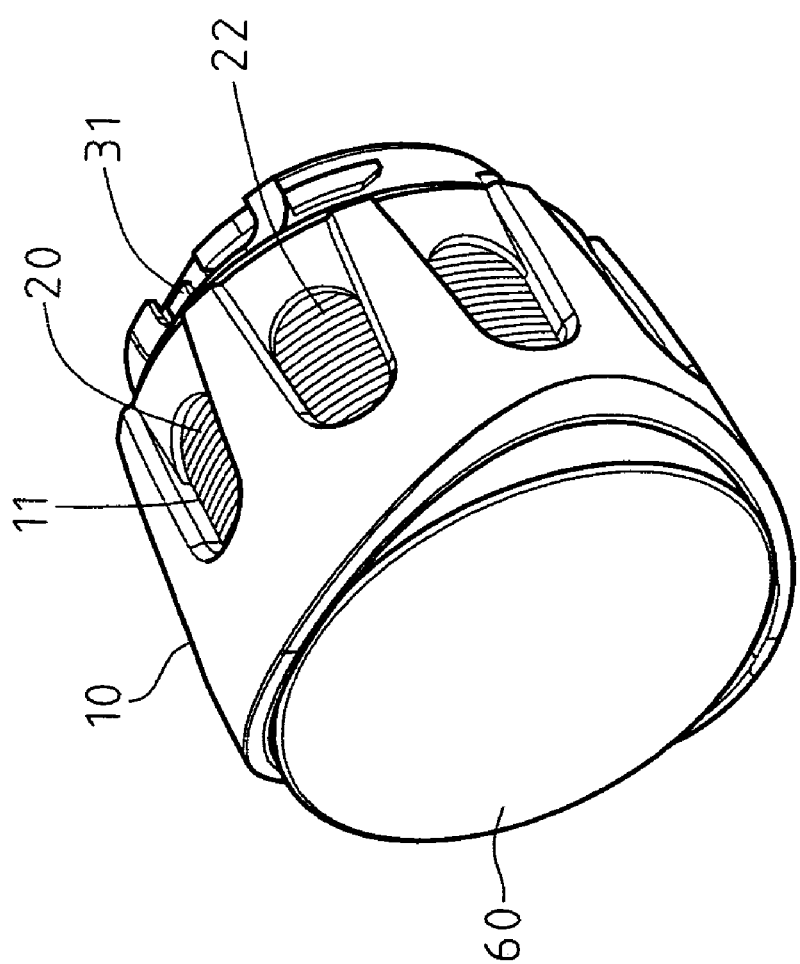
FIG. 1 is a perspective view of a head assembly of a LED headlight for bicycle according to a first preferred embodiment of the invention.
Figure 2:
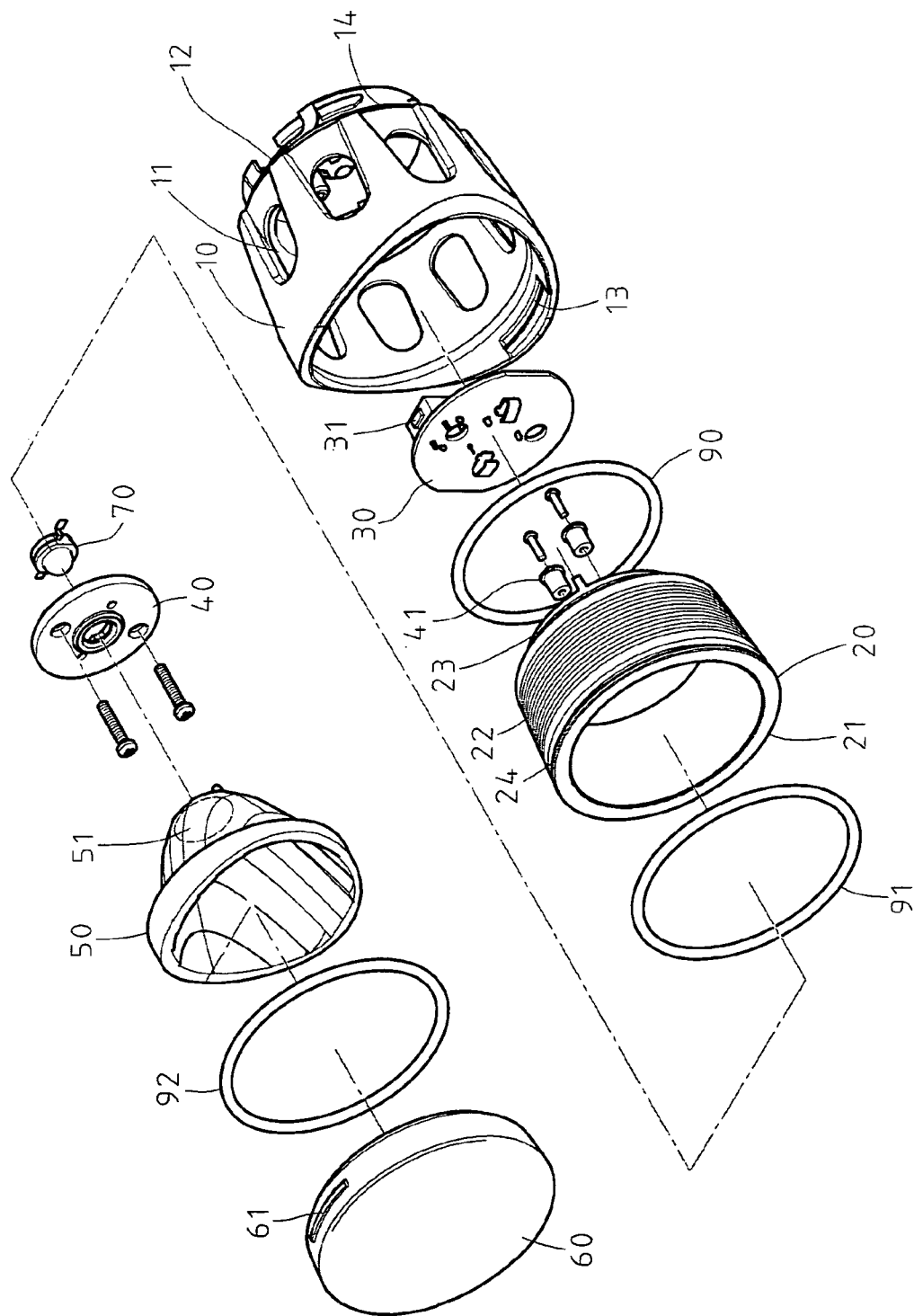
FIG. 2 is an exploded view of FIG. 1.
Figure 3:
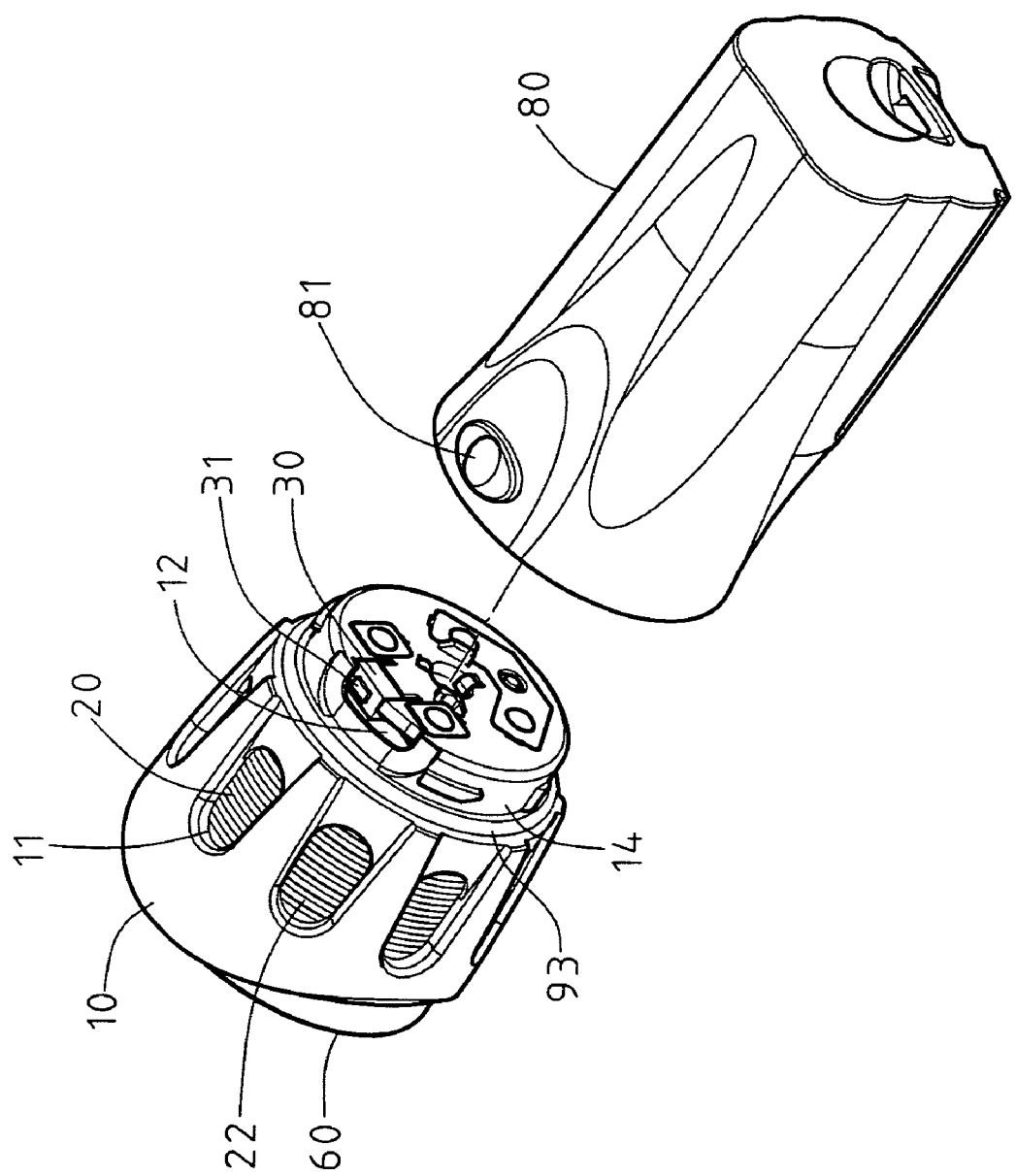
FIG. 3 is an exploded perspective view of the head assembly to be assembled with a battery compartment.
Figure 4:
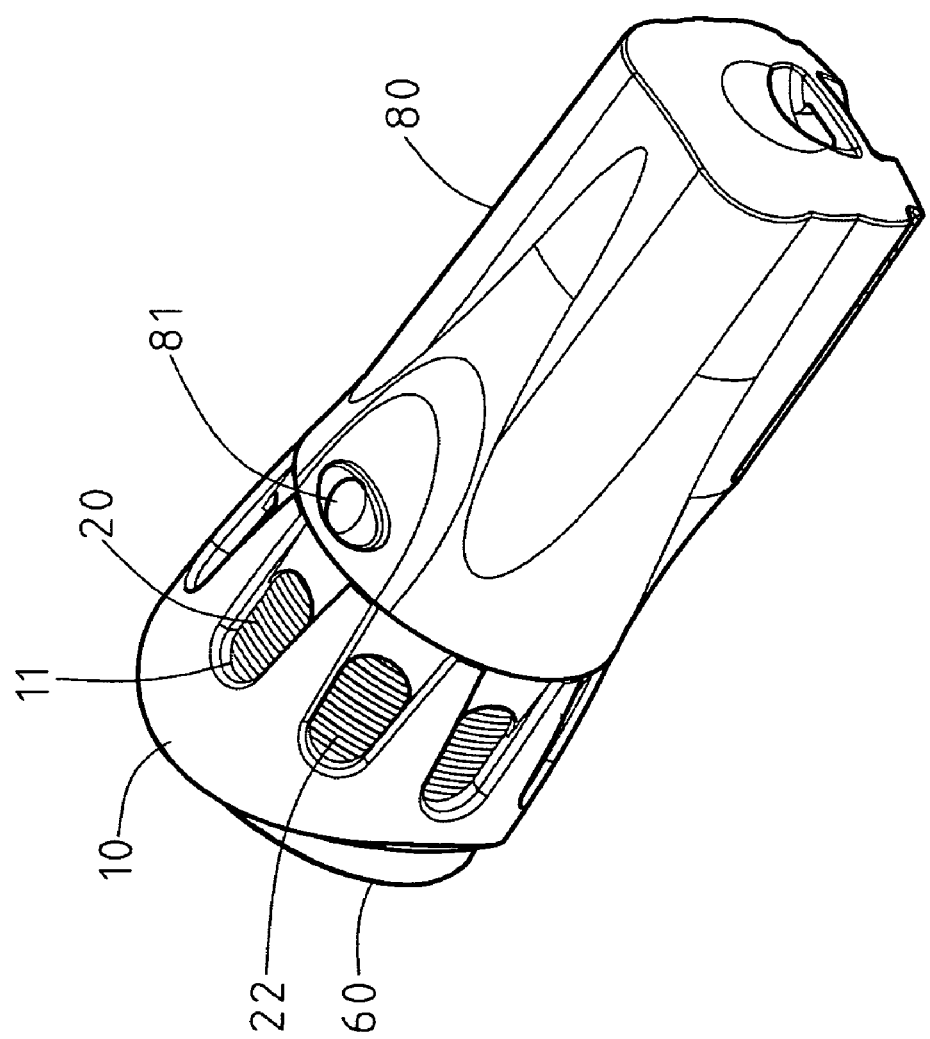
FIG. 4 is a perspective view of the assembled head assembly and battery compartment.
Figure 5:
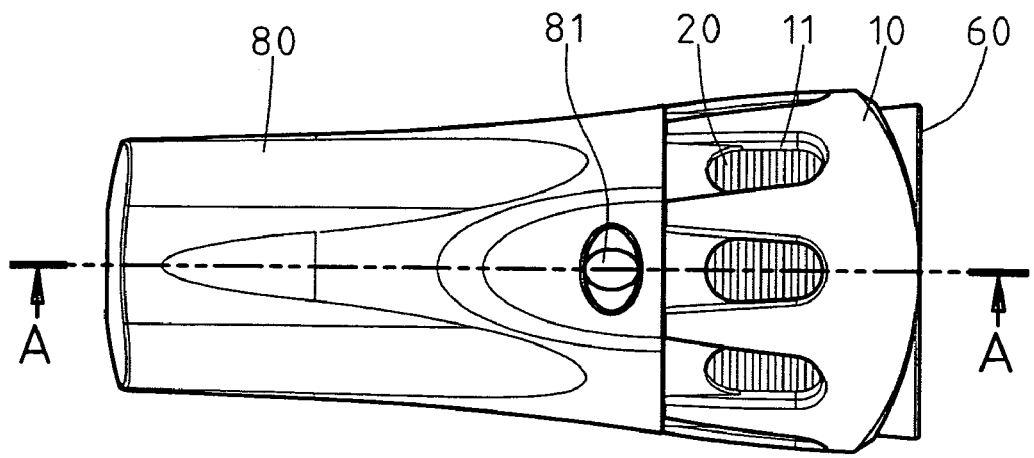
FIG. 5 is a top plan view of FIG. 4.
Figure 6:
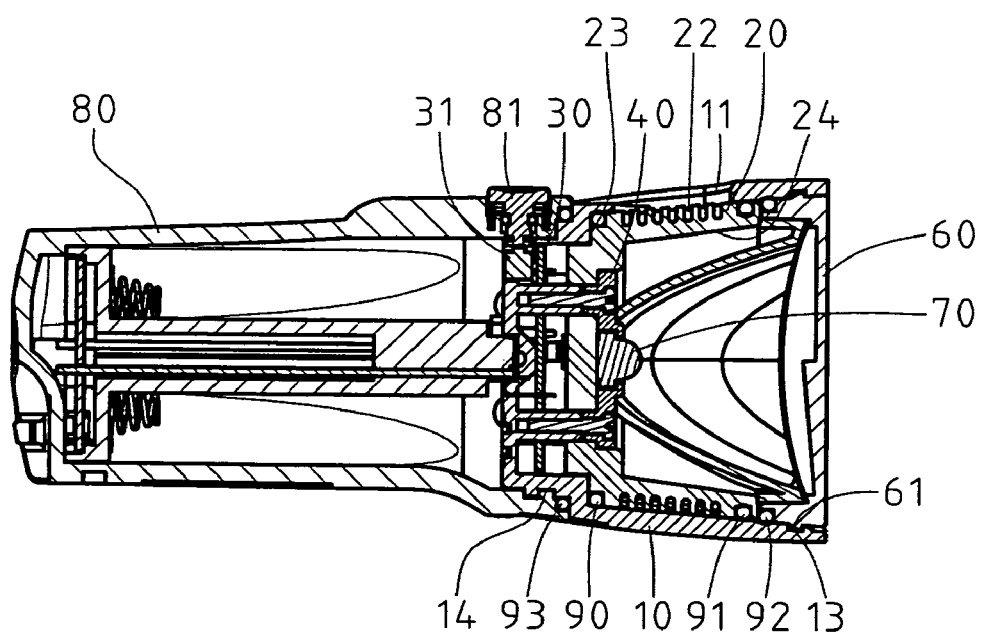
FIG. 6 is a cross-sectional view taken along line A-A of FIG. 5.

Referring to FIGS. 1 to 6, a LED headlight for bicycle in accordance with a first preferred embodiment of the invention comprises a substantially cylindrical head assembly 10 having a blind end terminating in a closed end, the head assembly 10 being insulative and being of an injection-molded, unitary member, the head assembly 10 including a plurality of openings 11 equally spaced apart around its outer surface, the openings 11 being smaller than the fingers so as to prevent the fingers from inserting into the head assembly 10 to contact hot components in an operating state of the headlight, a rearward annular staged extension 14, a cut 12 on the extension 14, and two opposite slots 13 on an inner surface proximate its front opening; and a circular lens 60 having two opposite projections 61 on its periphery.

The LED headlight further comprises a cylindrical heat sink 20 formed of heat conductive aluminum and including an internal space 21, a plurality of annular grooves 22 formed in parallel on its outer surface for increasing heat removal efficiency, an annular first trough 23 spaced from a rear end of the grooves 22, and two annular second troughs 24 spaced from a front end of the grooves 22; and a water resistant ring assembly formed of a rubber or the like including a first sealing ring 90 put on the first trough 23, a second sealing ring 91 put on one second trough 24, and a third sealing ring 92 put on the other second trough 24.

The LED headlight further comprises a print circuit board (PCB) 30 including a rear first contact 31 which is projected out of the cut 12 and fastened when the PCB 30 is fitted onto the closed end of the head assembly 10; a parabolic reflector 50 including a rear opening 51; an LED bulb 70 fitted in the opening 51; and a heat conductive disk 40 including a center hole and a plurality of conductors 41 each having one end electrically connected to the LED bulb 70 and the other end electrically connected to second contacts of the PCB 30. The heat conductive disk 40 is mounted on a rear portion of the reflector 50. The assembled reflector 50, the heat conductive disk 40, and the LED bulb 70 are mounted inside the head assembly 10. Next, fit the projections 61 in the slots 13 to secure the lens 60 to a front end of the head assembly 10. As an end, a complete head assembly 10 with water-resistant capability is assembled.

The LED headlight further comprises a battery compartment 80 having a section of square on its rear portion and a section of circle on its flared front portion. The battery compartment 80 comprises a spring-biased switch 81 in the shape of a button formed on an outer surface, and an internal space for holding a plurality of batteries (not shown). The battery compartment 80 has its front end secured to the extension 14 by snapping in a manner well known in the art.

In operation (i.e., a person is riding a bicycle), the rider may press the switch 81 to electrically connect the batteries to the LED bulb 70 through a connection of the first contact 31 of the PCB 30, the second contacts of the PCB 30, and other electrical components when the switch 81 is in an on position. Advantageously, high heat generated by the LED bulb 70 is quickly dissipated through the heat conductive disk 40, the heat sink 20, and the openings 11. To the contrary, the user may press the switch 81 again to electrically disconnect the batteries from the LED bulb 70 by disconnecting the first contact 31 from the second contacts when the switch 81 is in an off position.

Figure 7:
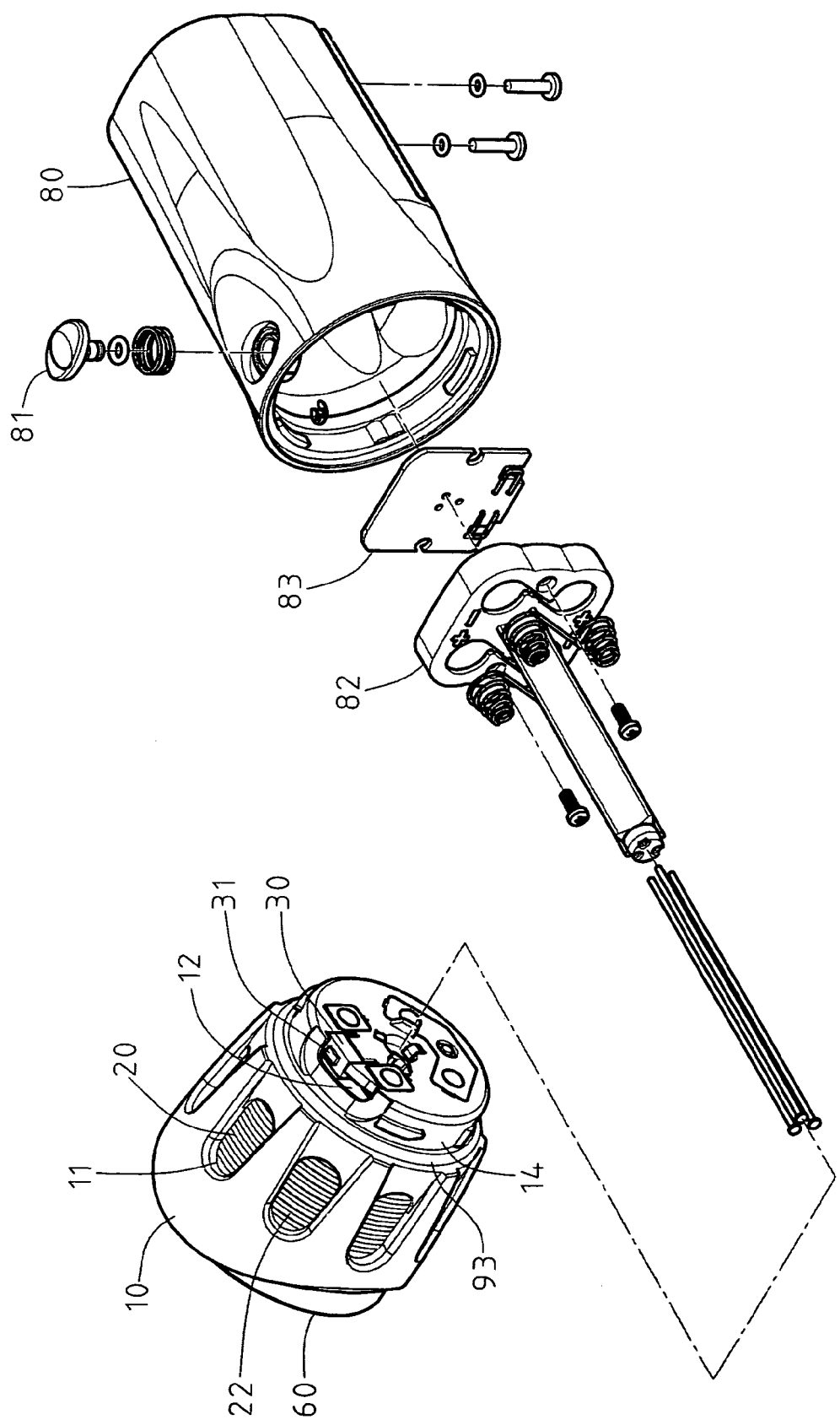
FIG. 7 is an exploded perspective view of the head assembly to be assembled with a battery compartment having a plurality of rechargeable batteries (not shown) held therein according to a second preferred embodiment of the invention where the battery compartment is shown in an exploded view.

Referring to FIG. 7, a second preferred embodiment of the invention is shown. The characteristics of the second preferred embodiment are detailed below. The battery compartment 80 further comprises a charging board 83 mounted on its closed end, a charging seat 82 capable of charging four rechargeable batteries (not shown) at one time, and two rear contacts (not shown) electrically connected to a generator of the bicycle. The rechargeable batteries are charged while the headlight is in an operating state (i.e., a rider is riding the bicycle).

Figure 8:
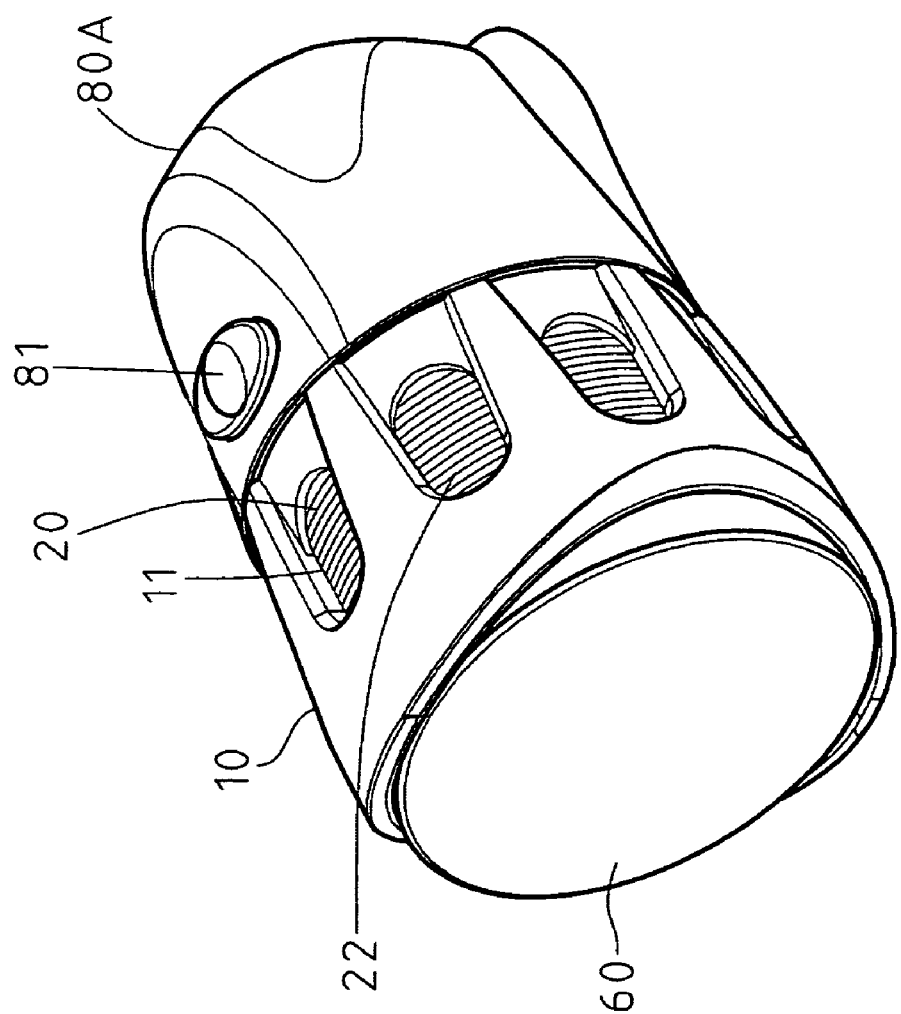
FIG. 8 is a perspective view of a LED headlight for bicycle according to a third preferred embodiment of the invention where power is supplied from a generator of the bicycle.

Referring to FIG. 8, a third preferred embodiment of the invention is shown. The characteristics of the third preferred embodiment are detailed below. The battery compartment is replaced by a case 80A having two rear contacts (not shown) electrically connected to a generator of the bicycle. Power is supplied from a generator of the bicycle to the head assembly 10 directly while the headlight is in an operating state (i.e., a rider is riding the bicycle).

While the invention herein disclosed has been described by means of specific embodiments, numerous modifications and variations could be made thereto by those skilled in the art without departing from the scope and spirit of the invention set forth in the claims.

What is claimed is:

1. A headlight mountable on a bicycle comprising:
    a head assembly including:
    a substantially cylindrical barrel formed on an insulative material and including a plurality of openings equally spaced apart around an outer surface of the barrel, a rearward annular stanged extension, a cut on the extension, and a plurality of front slots on an inner surface;
    a circular lens having a plurality of projections on a periphery of the lens, the projections adapted to fit in the slots to secure the lens to a front end of the barrel;
    a cylindrical heat sink including a plurality of parallel grooves on a second outer surface of the cylindrical heat sink, at least one annular first trough spaced from a front end of the grooves, and at least one annular second trough trough spaced from a front end of the grooves;
    a water resistant ring assembly including at least one first sealing ring put on the first trough, and at least one second sealing ring put on the second trough;
    a printed circuit board (PCB) including a rear fist contact projected out of the cut and secured thereto when the PCB is fitted onto an end of the barrel, and a plurality of second contacts;
    a parabolic reflector, including a rear opening, mounted inside the barrel;
    an LED bulb fitted in the opening of the reflector; and
    a heat conductive disk including a center hole and mounted on a rear portion of the reflector;
    a plurality of conductors, each having one end electrically connected to the LED bulb and a second end electrically connected to one of the second contacts of the PCB;
    a power supply releasably secured to the extension and including a switch;
    wherein the switch is manually movable between on and off positions and is adapted to electrically connect the power supply to the LED bulb by connecting to the first contact when the switch is in the on position, and in response to disposing the switch in the on position, heat generated by the LED bulb is dissipated through the heat conductive disk, the heat sink and the openings of the barrel.

* * * * *